United States Patent [19]

Thompson

[11] 3,819,909

[45] June 25, 1974

[54] CONTROL DEVICES

[75] Inventor: William Arthur Thompson, Sydney, New South Wales, Australia

[73] Assignee: Air Logic Pty. Limited, New South Wales, Australia

[22] Filed: Mar. 13, 1972

[21] Appl. No.: 234,353

[30] Foreign Application Priority Data

Mar. 22, 1971 Australia............................ 4384/71

[52] U.S. Cl.235/61.11 R, 235/61.11 E, 235/61.11 J, 235/201 FS, 250/231 R, 250/219 DC, 340/347

[51] Int. Cl...... G06k 7/01, G06d 3/00, G06m 1/06, G01d 5/34, G01n 21/30, G08c 9/00, G06k 7/10

[58] Field of Search......... 250/231 R, 237, 219 DC; 116/64, DIG. 30; 340/347 P, 32.4; 178/5.4 TE, 26 A; 235/61.11 E, 61.11 D, 61.11 A, 61.11 J, 61.6 E, 201 FS, 61.11 H; 73/194 R, 194 M; 137/81.5; 200/46

[56] References Cited

UNITED STATES PATENTS

| | | | |
|---|---|---|---|
| 2,882,520 | 4/1959 | Hass | 250/231 R |
| 2,900,629 | 8/1959 | Daniels | 340/347 P |
| 3,057,974 | 10/1962 | Cohen | 200/46 |
| 3,096,444 | 7/1963 | Steward | 340/347 P |
| 3,239,674 | 3/1966 | Aroyan | 250/203 |
| 3,341,691 | 9/1967 | Modersohn | 235/61.11 E |
| 3,358,202 | 12/1967 | Pabst | 250/231 R |
| 3,381,288 | 4/1968 | Van Vlodrop | 340/32.4 |
| 3,472,259 | 10/1969 | Hatch | 137/81.5 |
| 3,482,081 | 12/1969 | Peterson | 235/61.11 R |
| 3,483,389 | 12/1969 | Cronin | 250/231 R |
| 3,593,004 | 7/1971 | Ryan | 235/61.11 E |
| 3,609,305 | 9/1971 | Davis | 235/61.11 E |
| 3,627,992 | 12/1971 | Davies | 235/61.11 J |

*Primary Examiner*—Daryl W. Cook
*Assistant Examiner*—Robert M. Kilgore
*Attorney, Agent, or Firm*—Weiner, Basile and Weintraub

[57] ABSTRACT

A sensor device comprising an array of energy delivery elements connectible with an energy source, and an array of energy receiver elements spaced therefrom with each energy delivery element being axially aligned with one of the energy receiver elements, and an apertured control element adapted to be passed between the arrays for selective registration between its apertures and certain ones of the energy delivery (and receiver) elements during relative passage thereof, the spaced relationship of the energy delivery/receiver elements and of the apertures within the control element being such that, as the control element passes between the delivery and receiver orifices, a Vernier effect will occur whereby sequential registration will occur between successive ones of the receiver elements and successive ones of the apertures in the control element.

9 Claims, 11 Drawing Figures

PATENTED JUN 25 1974 3,819,909

SHEET 2 OF 4

CONTROL DEVICES

This invention relates to a device for accurately detecting, monitoring and/or controlling the performance of a functional condition.

The invention, in its fundamental form, is based on the employment of a movable control element which utilises a Vernier principle for effecting a programmed switching function, the control element bearing data relating to the functional condition.

The device according to the present invention may therefore be broadly defined as comprising an array of detectors or energy receiver elements and a control element adapted to be passed in proximity to the detectors or energy receiver elements for cooperation therewith, the control element bearing data in the form of energizing regions spaced at intervals to permit selective energization of the detectors or energy receiver elements during passage of the control element relative thereto, the relationship between the spacing of the energizing regions in the control element and the spacing between the detector or receiver elements being such that, during relative passage of the control element, sequential registration will occur between successive ones of the energizing regions in the control element and successive ones of the detectors or receiver elements.

The control element may be in the form of a magnetic tape having magnetically coded regions which, on registration with selective magnetically sensitive detector elements, for example, magnetic reed switches, causes actuation of said switches for adaption of associated electric circuits.

Alternatively, the control element may be in the form of an apertured or "punched" tape and the detectors may be in the form of an array of mechanical feelers which are resiliently biased for registration with (i.e., through) the apertured tape, the "energizing regions" being, the apertures in the tape.

Preferably, the control element is in the form of an apertured or punched tape through which a fluid medium may be passed and the detectors are in the form of elements which are acted upon by, or receive therein, the fluid medium which passes through the control element. The above employed expression "data in the form of energizing regions" is therefore to be construed, in the present context, as including both active energizing regions (in the form of, e.g., magnetically coded regions) and passive energizing regions (in the form of, e.g., apertures within a tape).

Therefore the invention in accordance with a preferred form may be defined as comprising at least one energy transmission or energy delivery element, an array of energy detector or energy receiver elements spaced from the energy transmission or delivery element(s), and a control element adapted to be passed between the energy transmission or delivery element(s) and the energy detector or receiver elements, the control element being apertured at intervals to permit selective transmission or delivery of energy from the energy transmission or delivery element(s) to the energy detector or receiver elements during passage of the control element therebetween, the relationship between the spacing of the apertures in the control element and the spacing between the energy detector or receiver elements forming said array being such that, during passage of the control element, sequential registration will occur between successive ones of the apertures in the control element and successive ones of the energy detector or receiver elements forming said array.

The abovementioned sequential registration may be equated with the sequential registration that occurs between graduations on a Vernier scale during manipulation of such a scale. Sequential registration will occur if the spacing between adjacent elements of a row (or array) of uniformly spaced detector or receiver elements differs slightly from the spacings between uniformly spaced apertures located in a corresponding row in the control element. The array elements and/or the control element apertures may be spaced apart in either a linear or arcuate relationship.

An advantage of this arrangement is that it enables measurement, detection, monitoring or control of an operational function to fractional intervals of either the aperture spacings or array element spacings.

Preferably the relative spacings are such that sequential registration occurs at space intervals of 1/10th of the distance between adjacent apertures (or detector or receiver elements, hereinafter referred to only as receiver elements). For example, if a number of receiver elements are arranged in a longitudinally aligned row for cooperation with a complementary row of apertures in the control element, the receiver elements being spaced at 9/100th of a unit and the apertures spaced at 1/10th of a unit, then sequential registration will occur between successive apertures and receiver elements as the control element is advanced in stages of 1/100th of a unit. If the number of receiver elements is nine, and the row of apertures in the control element is continuous, then a cyclic sequence of registrations corresponding to increments of 1/100th of a unit of movement through to 9/100th of a unit of movement will occur as the control element is advanced past the receiver elements.

A typical application of the device is in the accurate measurement or control of the relative position or speed of some component, for example of some machine part, or the motion of a screw or conveyor belt. Information corresponding to the instantaneous relative position of, for example, the conveyor belt, is transferred to the movable control element, which might take the form of a punched tape or rotating disc. Each of the receiver elements of the device may be connected to an input of a logic circuit or such other device as may be used, which is responsive to output signals from the receiver elements to function in a sensory or controlling capacity.

Any form of energy may be used which is capable of transmission through the apertures in the control element(s) to selected receiver elements and which is capable of being detected by the receiver elements or of passing through the receiver elements to a suitable detector. These forms include light energy which can be detected by photo-electric devices and pressurised gas which can be directed as a stream into receiver orifices connected to suitable pressure responsive devices.

Preferably the transmission or delivery elements are arranged in an array corresponding to the array of receiver elements whereby energy may be transmitted or delivered from each transmission or delivery elements respectively to a receiver element in axial alignment therewith.

The invention will be more fully understood from the following description of two preferred embodiments thereof taken in conjunction with the accompanying drawings wherein.

Figure 1:
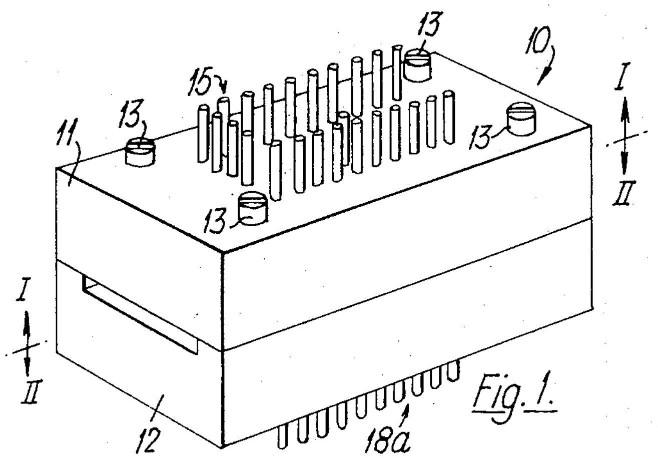
FIG. 1 is a perspective view of a device in accordance with one embodiment of the invention.
Figure 2:
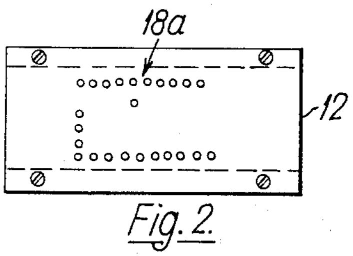
FIG. 2 is an inverted plan view of the device of FIG. 1.
Figure 3:
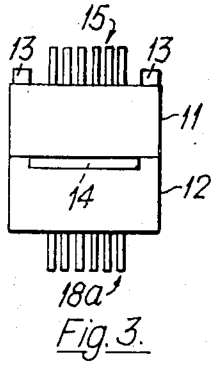
FIG. 3 is an end view of the device of FIG. 1.

The examples which will be described will be concerned with pneumatic devices, although it is not intended to limit the scope of the invention thereto.

Referring to FIGS. 1 to 4, a sensing unit 10, comprises a delivery manifold 11 in the form of a rectangular block, which is mounted to a similar, receiver manifold 12 by means of four screws 13. The receiver manifold has a channel 14 formed therein, in its surface adjacent the delivery manifold, the channel permitting a control element 16, in the form of an apertured strip or tape, to be passed freely therein between the respective manifolds. The delivery manifold comprises a number of delivery orifices 17 formed in one surface thereof, (FIG. 4A.) which are individually connectible, by outlets 15, to a supply (or separate supplies) of pressurised gas. An equal number of receiver orifices 18 are formed in the channel 14, each receiver orifice being in axial alignment with a corresponding delivery orifice for fluid passage communication therewith. The apertures in the control element 16 are arranged so that when the control element is passed through the channel between the delivery and receiver manifolds they selectively permit fluid passage communication between certain one(s) of the delivery orifices and the receiver orifice(s) aligned therewith.

The receiver orifices are arranged in a number of rows; a first, longitudinally orientated, row A—A (FIG. 4B) comprising ten receiver orifices, spaced at intervals of 9/100th of a unit, a row B—B, parallel to the first, of ten receiver orifices spaced at intervals of 1/10th of a unit, and a row of three transversely disposed receiver orifices indicated at C, D and E respectively. An additional orifice, F, herein referred to also as the discriminator orifice, is spaced in transverse alignment with one of tde receiver orifices in the row A—A.

The tape apertures and receiver orifices each have a diameter of 1/20th unit. This diameter is comparable both to the center spacing between adjacent receiver orifices in the row A—A and to the spacing between apertures in the corresponding row in the tape. As a result, it is possible for "true" registration (alignment) and "false" registration (near alignment) to occur simultaneously between certain ones of the receiver orifices in the row A—A and certain ones of the apertures in the corresponding row in the tape. In each case, some fluid can pass through the aperture in question to the respective receiver orifice resulting in an output therefrom.

The function of the discriminator orifice F, when used in conjunction with suitable logic circuitry, is to distinguish between true registration which may occur between one receiver orifice in the row A—A and an aperture in the control element and which represents a true indication of the relative control element position, and false registration which may occur as well and which would correspond to a misleading indication of the relative position of the control element. The manner in which the receiver orifice F can be used to fulfil this function will be illustrated by way of example in a latter part of this specification.

An alternate, crude form of discrimination can, in some circumstances, be obtained by setting the respective sensitivities, of such output devices as may be employed, to reject all output signals, from the receiver orifices, which are below the levels of strength consistent with the signal level at full registration.

Figure 4A:
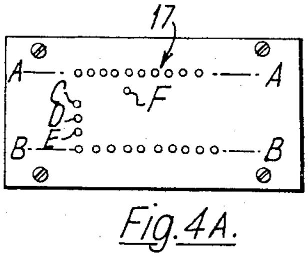
FIG. 4A is a plan view of part of the device taken along the line I—I of FIG. 1.
Figure 4B:
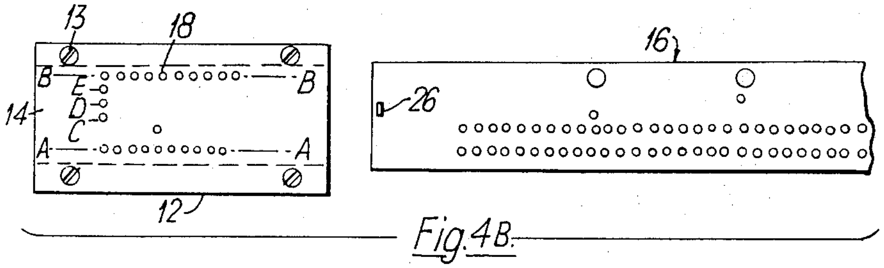
FIG. 4B is a plan view of part of the device taken along the line II—II of FIG. 2 and of a section of tape which is used in conjunction with the device of this embodiment.

Referring to FIG. 4B, the control element or strip 16 consists of a length of non-corrosive tape encoded with apertures whose leading edges uncover the orifices in the receiver manifold in the course of movement of the tape. The apertures are arranged in longitudinal rows, or channels corresponding with selected orifices or rows of orifices in the delivery and receiver manifolds; a first row of apertures uniformly spaced at 1/10th unit intervals corresponding to the row A—A of receiver orifices; a second row of apertures, also spaced at 1/10th unit intervals, and arranged to pass over the discriminator orifice F; three further rows (channels) containing each a single aperture arranged to pass over, respectively, the orifices C, D and E; and a further row, of unit spaced apertures, corresponding with the row B—B of orifices in the receiver manifold.

Each of the receiver orifices has an outlet 18a individually connectible to a fluid valve or such other pressure responsive device as may be used. As the tape advances past the receiver orifices, a vernier effect will occur at the row A—A so that outputs from the receiver orifices in that row will occur in a cyclic sequence at 1/100th unit increments of tape movements, and which represent tape displacements from a reference 0/100th unit to 9/100th unit. At the moment of 10/100th of a unit being reached, the outlet of a receiver orifice in the row B—B will be pressurized by registration between that receiver orifice and an aperture in the corresponding row in the control element.

The three apertures in the tape corresponding to the orifices C, D and E are spaced longitudinally in the tape at distances of one, two and three units respectively from a reference position in the tape. Consequently as the tape moves in the channel, between the delivery and receiver orifices, registration with respective tape apertures will occur sequentially at the orifices C, D and E at one, two and three units of movement respectively. For measurements exceeding three units, a larger number of receiver orifices may be used to complement the orifices C, D and E with the number of tape channels (or rows) increased accordingly, or, alternatively, a binary tape coding may be used or pulse outputs from receiver orifices may be registered on a suitable counter.

The outputs from the receiver orifices are thus indicative, accurately, of the relative position of the tape with respect to the manifolds between which it passes, and thus indicative of the relative position of some object or machine part with which the tape movement may be coordinated. As such, the outputs are readily adaptable to be fed into a suitable logic circuit for monitoring and/or control purposes.

Figure 5:
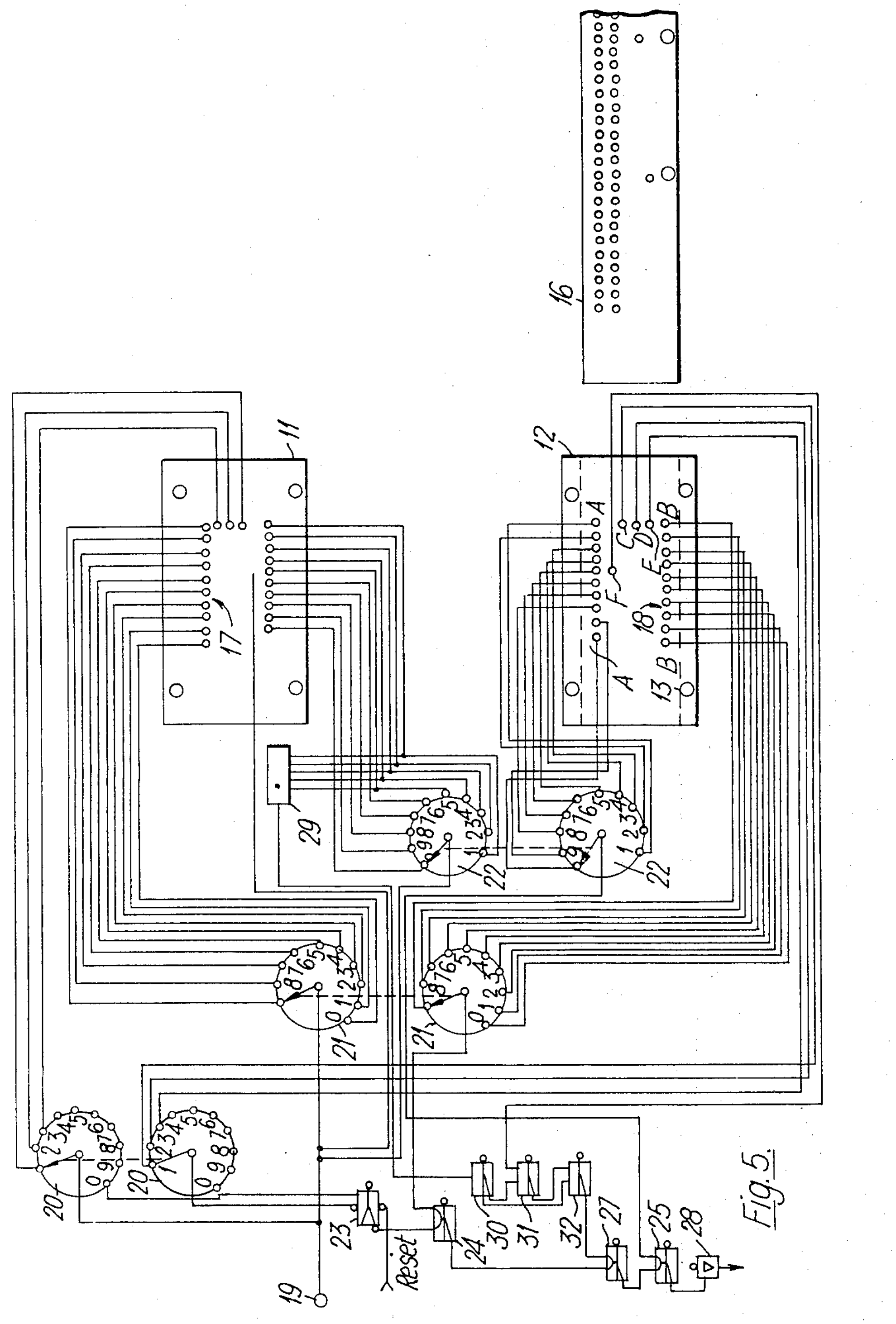
FIG. 5 is a schematic diagram of a logic circuit incorporating the device of FIG. 1.

One such logic circuit is shown schematically in FIG. 5. Basically this comprises three, 10-position, double ganged pneumatic switches, a system of logic units and a supply of gas or air pressure, suitably connected to the delivery and receiver orifices to provide an output whenever the encoded tape 16 reaches a predetermined position as set by dials on the pneumatic switches.

Referring to FIG. 5 in detail, receiver orifices C, D and E are connected to switch positions 1, 2 and 3 respectively on one half of pneumatic switch 20 and the corresponding delivery orifices are likewise connected to switch positions 1, 2 and 3 of the other half of the switch 20. Pressurised air from a supply 19 is supplied to a selected one of the three delivery orifices by the switch 20, which simultaneously connects the corresponding receiver orifice to an input of a memory unit 23. This switch selects from the "units" positions which, in this embodiment, are restricted to 0, 1, 2 and 3.

The receiver orifices in the row B—B are connected each to one of the ten switch positions on one half of pneumatic switch 21 and the corresponding delivery orifices are connected likewise to the other half of the switch 21. This switch simultaneously connects a selected one of the delivery orifices to the supply 19 and a corresponding receiver orifice in the row B—B to an input of an "AND" gate 24. This switch selects from the "1/10th unit" positions corresponding to dial readings from 0.0 to 0.9 in 0.1 unit steps.

The receiver orifices in the row A—A are connected each to one of the ten switch positions on one half of the third switch 22 and the corresponding delivery orifices are connected each to respective switch positions on the other half of the switch 22. This switch simultaneously connects a selected one of the delivery orifices to the supply 19 and a corresponding receiver orifice in the row A—A to an input of an "AND" gate 25. This switch selects from the "1/100th unit" positions corresponding to dial readings from 0.01 to 0.09 and 0.00.

In the diagram of FIG. 5, the tape movement is to the right and sequential registration occurs, in the case of row A—A, from right to left and, in the case of row B—B, from left to right. The receiver and delivery orifices are seen as they would appear when looking separately at the receiver and delivery orifices, with the receiver and delivery manifolds taken apart. The tape is shown schematically as emerging from the channel in the receiver manifold whereas, in FIG. 4B, the tape is shown as entering that channel. A stop 26 is provided in the tape (FIG. 4B) which abuts the outer end wall of the receiver manifold with the tape set for "zero" (or "start") position. In this embodiment, the logic circuit is designed for monitoring of tape movement in one direction only. For bi-directional monitoring a slightly modified circuit may be required.

Referring back to FIG. 5, the output of memory unit 23 is connected to the other input of "AND" gate 24, the output of which is connected to an input of "AND" gate 27. The output of gate 27 is connected to the other input of "AND" gate 25 and the output thereof is thence amplified by amplifier 28 which provides the final output signal from the logic circuit.

The operation of the circuit may conveniently be explained by an example. Suppose it is desired to know, by means of an output signal from amplifier 28, when the tape has moved by 2.35 units from an initial position. The switch 20 is set to position "2", the switch 21 is set to position "3" and the switch 22 is set to position "5." The tape is inserted between the manifolds and is set so that the stop 26 abuts the receiver manifold. It is now assumed that the tape moves in coordination with some object, the relative position of which requires monitoring. As the tape advances, no output will occur from the receiver-connected half of switch 20 until receiver orifice D is uncovered by the corresponding tape aperture which is located 2 units from the initial position. Until an output occurs at the receiver orifice D, no output will be produced at the amplifier 28 because of the sequence of "AND" gates 23, 24, 27 and 25 preceding it. When the tape has moved 2 units, a pressure signal from receiver orifice D will appear at one input of "AND" gate 24. Similarly when the tape has moved a further 3/10ths unit a signal from the third orifice in the row B—B will appear at the other input of the "AND" gate 24 and a positive output signal from "AND" gate 24 will result At this stage, a positive pressure output from amplifier 28 will occur when and only when a positive pressure signal (logical "1") is applied to the second input of each gate 25 and 27 respectively. The former will occur only if registration occurs at a receiver orifice in the row A—A which is selected by the switch 22 (in this case, switch position 5 has been selected). To guard against a false output signal from that receiver orifice, which can readily occur due to unwanted overlapping of the receiver orifices and the closely spaced tape apertures, a discriminator circuit, comprising a multiple input "NOR" gate 29, "NCR/OR" gate 30, "AND" gate 31 and "OR" gate 32 (the output of which is connected to the other input of the gate 27) is provided. When the switch 22 is set to one of positions 6 to 0, no positive pressure signal will be applied to any of the inputs of "NOR" gate 29 and its output will therefore be a logical "1." This output is applied to the "NOR/OR" gate 30 which has two outputs, one producing a logical state identical to the input and the other its complement. The complementary output, in this case a logical "0", is applied to one input of "OR" gate 32 and the output of gate 31 is connected to the other input of gate 32. No output from "OR" gate 32 will result unless both inputs of "AND" gate 31 are positive. This will only occur if a tape aperture registers with the discriminator orifice F since the output of this orifice is connected to one input of gate 31. The arrangement of tape apertures and dimensions thereof are made such that no registration at F will occur when the tape position falls within the first half of a 1/10th unit interval, and registration will occur when the tape position falls within the other half. To achieve this, the diameter of each tape aperture associated with orifice F has made 1/20th of a unit, and the space between the apertures, 1/20th of a unit. When switch 22 is set to one of positions 6 to 9 and 0, full registration may occur at some point in the movement of the tape at the selected orifice in the row A—A, representing a correct reading, or partial registration may occur at that orifice, representing a false reading, in which latter case, the discriminator circuit acts to inhibit the remainder of the circuit pending such event at which false registration will not occur. Generally, false registration at one of orifices 6 to 9 and 0 in the row A—A will occur when the tape is fully registering with one of the orifices 1 to 5 in the row A—A. The absence of pressure at the orifice F will ensure that "AND" gate 31 will give a logical "0" output when the tape position falls within the first half referred to above.

It has been found that while it may be necessary to discriminate against possible false registration at a selected receiver orifice in the row A—A when the switch 22 is set to one of positions 6 to 0, it is not always necessary, in some designs, to discriminate against a false registration when the switch is set to one of positions 1 to 5. Thus "OR" gate 32 as shown will always give a positive pressure output when switch 22 is set to one of positions 1 to 5.

The memory 23 is used to retain a logical "1" input at the following "AND" gate after the tape has passed the selected "units" position, since the pressure signal would otherwise disappear as soon as the tape apertures has moved beyond the receiver orifice. No memory is required for the outputs from the "1/10th unit" and "1/100th unit" switches since the dimensions of the correspoding tape apertures are such that a receiver orifice in the row B—B, say, at which registration takes place, will be uncovered, at least partly, for the duration in which a tape aperture passes from that receiver orifice to the next.

In some circumstances, a more accurate reading or indication may be obtained if the logic circuit is programmed to give an output when selected orifices are fully covered by tape material and there is zero transmission of energy to the selected receiver orifices, rather than when they are uncovered (full or partial transmission of energy thereto). These conditions are in a broad sense, equivalent, and it is not therefore intended to limit the scope of the invention to a narrow use of the word "registration". Thus, while in a narrow sense, for the purposes of the specific description, "registration" can be taken to be synonymous with "alignment," in the broader sense, it can also include the complementary mode of "non-alignment."

Figure 6:
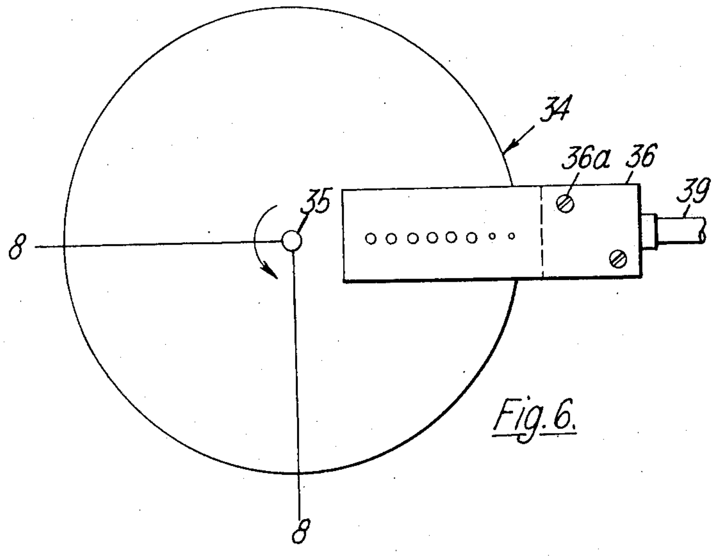
FIG. 6 is a plan view of a device in accordance with a second embodiment of the invention.
Figure 7:
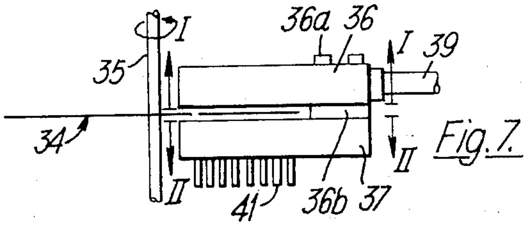
FIG. 7 is a side elevation of the device of FIG. 6.
Figure 8:
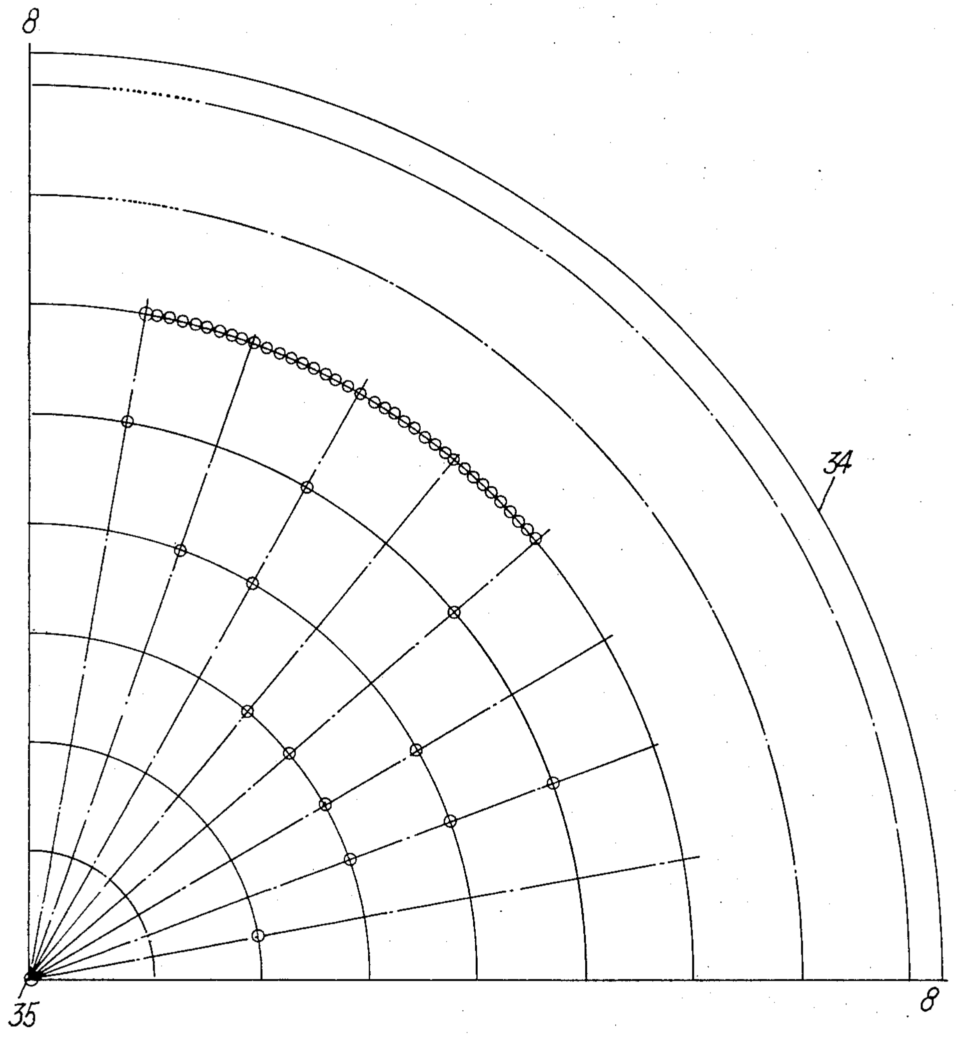
FIG. 8 is a detailed plan view of the segment 8—8 of FIG. 6.

The embodiment illustrated in FIGS. 6 to 8 differs from the above described embodiment principally in that a circular control element, in the form of an apertured disc, is used instead of the linear "tape" control element. The control element of this embodiment thus comprises a disc 34 mounted on a shaft 35 and arranged so that portion of the disc passes between a delivery manifold 36 and a receiver manifold 37. The delivery and receiver manifolds are mounted together, at one end, by means of two holding screws 36*a*, and are maintained in close parallel spaced apart relationship by means of a spacer 36*b*. The delivery manifold comprises a number of transversely (radially) spaced-apart delivery orifices 38 connected within the manifold to a common inlet 39 which is adapted for connection to a source of pressurised fluid (not shown). The receiver manifold comprises a number of receiver orifices 40 aligned with the respective delivery orifices. Each receiver orifice has an outlet 41 connectible with a fluid valve or such other pressure responsive device as may be used. The disc is rotatable about an axis which is substantially at right angles to the planes containing the delivery and receiver orifices.

Such ancillary parts such as a housing, bearings for the shaft and support means for the manifolds are not shown for reason of clarity of description.

Figure 9B:
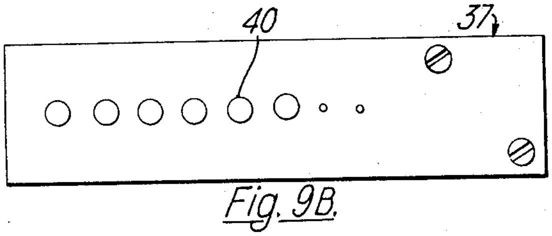
FIGS. 9A and 9B are plan views taken along the lines I—I and II—II respectively of FIG. 7.
Figure 9A:
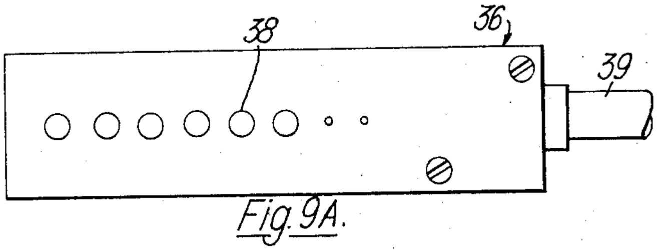

Referring to FIG. 8, the apertures within the disc are arranged in eight radially spaced circumferential rows. The receiver manifold (FIG. 9B) comprises eight corresponding transversely spaced-apart receiver orifices 40, each successive orifice being positioned to cooperate with the apertures within a successive row in the disc.

The apertures in each of the two outermost (first and second) rows are spaced at 1/5th° intervals (with respect to the disc axis) and angularly displaced by 1/10th of a degree from adjacent apertures in the other of the two rows. These rows correspond with the first and second orifices respectively in the delivery and receiver manifolds, which orifices, as well as the corresponding apertures, are made somewhat smaller than the remaining orifices and apertures. As the disc rotates, registration occurs in an alternate sequence between the first two delivery/receiver orifices and the apertures in the corresponding first and second rows, at intervals of 1/10th degree of rotation.

The apertures in the next (third) row in the disc are spaced at 1° intervals and register, successively, with the corresponding third delivery (and receiver) orifice. The outputs from the third receiver orifice are thus adapted to be fed to a suitable counter for an output indication of the number of degrees or rotation executed by the disc at a particular instance, to an accuracy of 1° of rotation.

Likewise, outputs from the first and second receiver orifices may be counted by suitable means to provide an accurate indication of the angular rotation executed by the disc to 1/10th of a degree accuracy, since registration occurs, as the disc rotates, between the first two delivery/receiver orifices and the apertures in the corresponding first and second rows, at intervals of 1/10th of rotation.

The outputs from the first and second receiver orifices are thus indicative, accurately, of the relative movement of the control element to increments equal to half of the aperture spacing in either the first or second rows.

The apertures in the remaining five rows are spaced in a binary coded sequence representative of "tens" and "hundreds" of degrees of rotation. Each of the remaining orifices in the receiver (or delivery) manifold corresponds with one of the said remaining five rows of apertures. As the disc rotates, registration occurs at the five last mentioned receiver orifices at 10° intervals, and the outputs thereof correspond to a binary coded sequence representative of "tens" and hundreds of degrees of rotation. The binary coding is such that the row of apertures corresponding to the least value digits (binary "1's", which are representative of "tens" of degrees of rotation) is adjacent the above mentioned third row, and the row corresponding to the largest value digits (a single binary "1" which is representative of $2^{5°}$ of rotation) is closest to the shaft 35.

Thus, the device of this embodiment is ideally suited for measurement or control of angular position or velocity of a rotating object. As such, the shaft 35 would be connected, either directly or by a system of gearing or the like, to the rotatable object, and the outlets 41 would be individually connected to, say, a suitable logic circuit. The output of the logic circuit can be adapted, by suitable programming, to actuate a switch or energise a display or to perform such other function as may be desired.

I claim:

1. A sensor device comprising at least one energy delivery element, an array of energy receiver elements spaced from the energy delivery element, and a control element adapted to be passed between the energy delivery element and the energy receiver elements, the control element being apertured at intervals to permit passage of energy from the energy delivery element to selected ones of the energy receiver elements during passage of the control element therebetween, the spacing between the energy receiver elements of said array being different by a fractional amount from the spacing between the apertures of said control element whereby, during passage of the control element, sequential registration occurs between successive ones of the apertures in the control element and successive ones of the energy receiver elements, said energy delivery element being connectable to a supply of an energy transmission medium, and an energy transmission medium is passed from the energy delivery element through the apertures in the control element to selected ones of the energy receiver elements, wherein the energy receiver elements are uniformly spaced apart and arranged in a longitudinal row, and the apertures in the control element are uniformly spaced apart and arranged in a row alignable with the row of energy receiver elements for said cooperation therewith.

2. A sensor device comprising at least one energy delivery element, an array of energy receiver elements spaced from the energy delivery element, and a control element adapted to be passed between the energy delivery element and the energy receiver elements, the control element being apertured at intervals to permit passage of energy from the energy delivery element to selected ones of the energy receiver elements during passage of the control element therebetween, the spacing between the energy receiver elements of said array being different by a fractional amount from the spacing between the apertures of said control element whereby, during passage of the control element, sequential registration occurs between successive ones of the apertures in the control element and successive ones of the energy receiver elements, said energy delivery element being connectable to a supply of pressurized fluid medium, and a fluid medium is passed from the energy delivery element through the apertures in the control element to selected ones of the energy receiver elements, wherein the control element comprises at least two transversely spaced-apart longitudinal rows of apertures, and the energy receiver elements consist in at least two said elements being transversely aligned and arranged for cooperation with the respective rows in the control element, each of the apertures in one of the rows being arranged to lie between adjacent successive ones of apertures in the other row.

3. A device as claimed in claim 1 wherein the spacings between the energy receiver elements are 9/100th of a unit and the spacings between the apertures are 1/10th of a unit.

4. A device as claimed in claim 1, wherein the control element is in the form of a punched tape.

5. A device as claimed in claim 2, wherein the control element is in the form of an apertured disc which is rotatable about an axis substantially at right angles to a plane containing the energy receiver elements.

6. A device as claimed in claim 1 including, additionally, means for discriminating between a true registration and a false registration of two or more said energy receiver elements and associated said apertures in said control element.

7. A device as claimed in claim 6 wherein the discriminating means includes a subsidiary energy receiver element, and includes also a row of spaced-apart subsidiary apertures in the control element, the subsidiary apertures being alignable with said subsidiary energy receiver element during relative passage of the control element.

8. A device as claimed in claim 1 wherein the energy delivery element is connectible to a supply of pressurised fluid medium and a fluid medium is passed from the energy delivery element through the apertures in the control element to selected ones of the energy receiver elements.

9. A device as claimed in claim 1 wherein the number of energy delivery elements is equal to the number of energy receiver elements, each energy delivery element being axially aligned with one of the energy receiver elements.

* * * * *